United States Patent [19]

Currier

[11] Patent Number: 4,833,452

[45] Date of Patent: May 23, 1989

[54] SAFETY DEVICE AND METHOD OF ESTABLISHING GROUP COMMUNICATION

[75] Inventor: Sam L. Currier, Thayer, Mo.

[73] Assignee: Sam L. Currier, Thayer, Mo.

[21] Appl. No.: 45,598

[22] Filed: May 4, 1987

[51] Int. Cl.⁴ .......................... G08B 1/08; H04Q 7/00

[52] U.S. Cl. .................................... 340/539; 340/573; 455/73; 455/78; 455/79; 455/88; 455/95; 455/229

[58] Field of Search ............... 340/539, 531, 573, 903; 455/73, 78, 79, 88, 95, 100, 9, 11, 67, 134, 115, 194, 229; 370/29

[56] References Cited

U.S. PATENT DOCUMENTS 3,532,986 10/1970 Gelushia et al. ...................... 455/78

4,020,421 4/1977 Elder et al. ......................... 455/229

4,216,432 8/1980 Imazeki et al. ....................... 455/79

4,501,017 2/1985 Higgins et al. ....................... 455/78

4,673,921 6/1987 Saito et al. ......................... 340/539

*Primary Examiner*—Donnie L. Crosland

*Attorney, Agent, or Firm*—Gravely, Lieder & Woodruff

[57] ABSTRACT

An electronic two way signalling apparatus for permitting two or more persons not in line-of-sight with each other to activate transceivers for broadcasting and receiving radio frequency signals alerting those persons of the presence of others within the range of the broadcast signals. The apparatus carried by such persons provides a fixed outgoing radio frequency signal on a random broadcast time of short duration and reception of incoming radio frequency signals at time when a broadcast is silent, and each such apparatus is identical in operation.

6 Claims, 1 Drawing Sheet

SAFETY DEVICE AND METHOD OF ESTABLISHING GROUP COMMUNICATION

BACKGROUND OF THE INVENTION

1. Field of the Invention

This invention relates to a safety device and method of establishing group communication between persons separated from each other and not in visual contact.

2. Description of the Prior Art

Prior presently known to me to be of interest is Dickson 4,173,016 issued Oct. 30, 1979 which pertains to a system of short range transceivers carried by persons of a group for transmitting coded messages between selected persons in such a group where the reception of a signal by a selected one of such a group implies the need for a response.

Another prior art is Cox 4,598,272 issued July 1, 1986 in which electronic monitoring apparatus permits a person to locate other persons by means of a pair of radio devices having alarm units responsive to the broadcast of a signal between the radio devices.

The foregoing prior art may be summarized as being representative of radio communicating devices that have been made to establish radio contact with each other so that persons are able to communicate for any predetermined reasons. In the Dickson patent the transceivers allow for user intervention in predetermined situations so that complex communication between persons may be established. The Cox patent discloses the use of at least two monitoring devices, neither of which will be useful without the other, and the distance between the devices enters into the effectiveness of the two devices.

SUMMARY OF THE INVENTION

In its broad aspects the present invention resides in a method for establishing communication between all persons in a predetermined area, but out of visual contact, so that each person is made aware of the others that may be in that predetermined area.

An important object of the present invention is to provide transceiver devices that do not permit user intervention in the operation thereof when activated but establish communication between similar devices within a limited range or distance between devices.

A further object of the present invention is to provide transceivers with responsive alarm capability upon receipt of a radio signal, whereby hunters moving about in a common game area will be made aware of each others presence simply by all such persons being equipped with similar transceivers.

Each year many hunters lose their lives and many more are injured as a result of accidental shooting. Most of these accidents are a result of the victim being mistaken for the game being hunted. This mistaken identity is usually due to the fact that neither the victim nor the person firing the gun knows of the others presence. The present invention relates to a personal electronic signaling (warning) apparatus which contends with this problem. This invention is directed to apparatus of this type by which a hunter will be alerted to anothers presence within a predetermined area. Thus being aware of anothers presence they will be much more cautious before firing their gun. The method of the invention is to provide a means of determining the presence of another person within a predetermined area for whatever reason. Other objects will become apparent from the description of the invention which follows hereafter:

BRIEF DESCRIPTION OF THE DRAWINGS

The present invention may be exemplified in drawings as follows.

DETAILED DESCRIPTION OF THE EMBODIMENT

Figure 1:
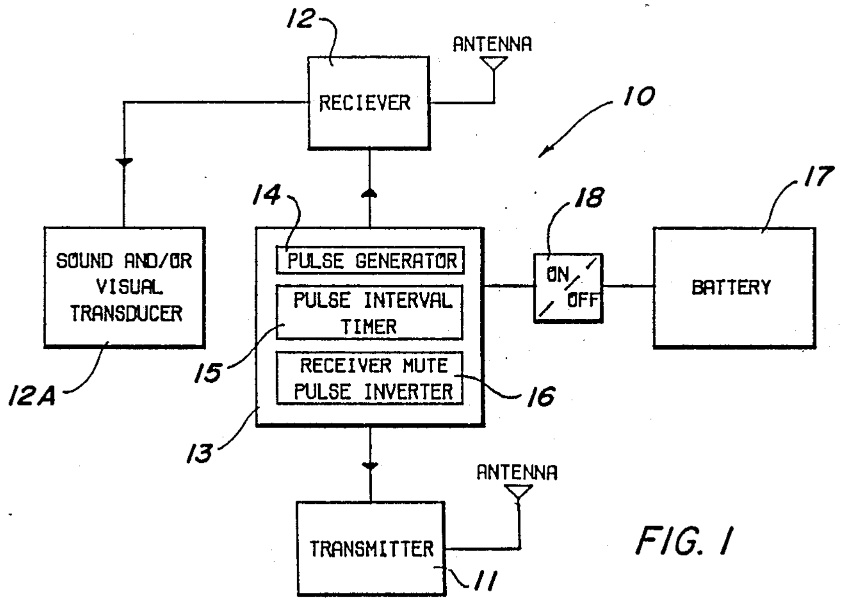
FIG. 1 is a block diagram of a typical transceiver embodying the components which are required to serve the purposes referred to above.

A preferred embodiment of the invention is disclosed in a block diagram in FIG. 1. The transceiver 10 is composed of a number of components making up an intergraded circuit. These components comprise a transmitter 11, a radio receiver 12, and a unit 13 made up of a pulse generator 14, a pulse interval timer 15 and a receiver mute pulse inverter. A battery power source 17 is connected into unit 13 and a simple "on-off" switch 18 is provided for the only user control. While the transmitter 11 and receiver 12 are shown with separate antennas, a common antenna is intended. The unit 13 can be a low power transistorized radio transceiver with a timing circuit powered by the battery 17 of dry cell type. The receiver side of the transceiver is equipped with a transducer 12A which may emit a sound or a visual response to receive the signal broadcast from the transmitter 11 of a similar transceiver 10 located within the range of its broadcast signal.

The components making up the unit 13 are readily available in a size suitable for miniaturizing the present unit so it can be easily attached to or carried by a user. The unit 13 may be an intergraded circuit of Motorola denominated a QUAD-2 input NAND gate, or an equivalent. The sound or visual transducer may employ a pizeo bi-metal device or it may be a light emitting diode, or an equivalent. The battery to be used is a 9V dry cell. The transmitter 11 is pulse modulated with a pulse reoccurrence time of a few seconds. The units 15 and 16 supply the positive going pulses that turn on the transmitter for the desired amount of transmit time to establish the pulse interval, and it develops an inverted pulse and directs it to mute the receiver during the transmit time so the transducer is not activated by its own transmitter. The receiver 12 will receive radio frequency pulses from nearby transmitters which activate the transducer 12*a*.

Figure 2:
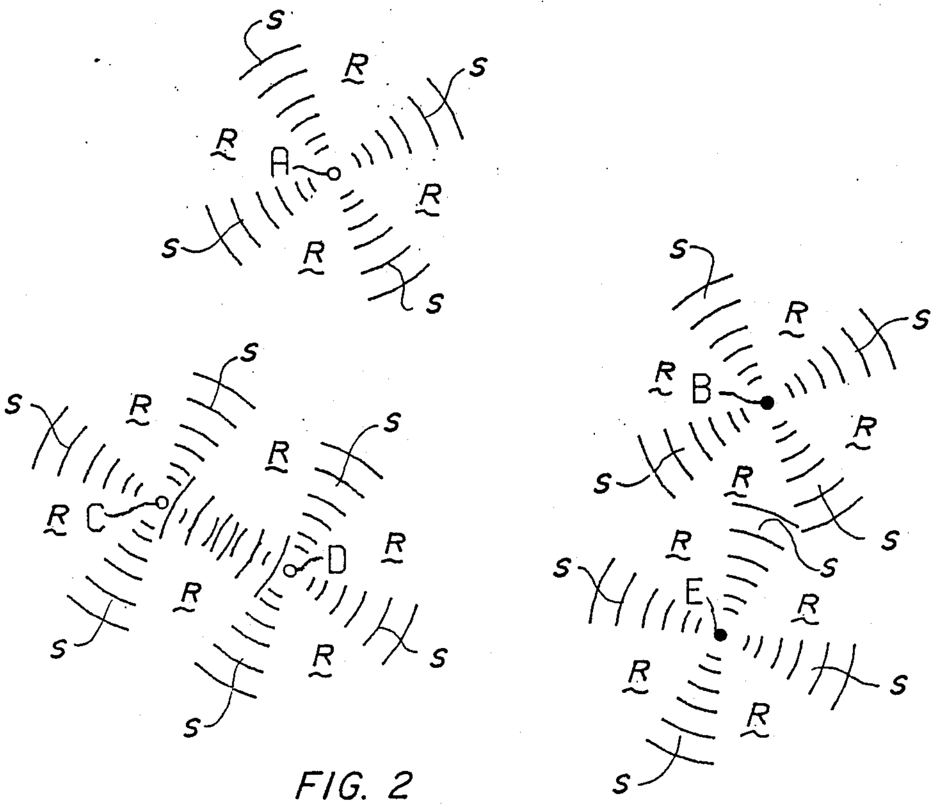
FIG. 2 is a diagrammatic plan view of a number of persons in a generally predetermined area, each such person being equipped with the same type transceiver capable of transmitting signals of short range capability for the purpose of establishing the presence of others within the range capability.

FIG. 2 illustrates the method of the invention, whereby the presence of a number of people, not previously known to be present, in a common area can be made known by the use of the transceiver 10 described in connection with FIG. 1. The method assumes that each person will be wearing the same type transceiver and that all of the transceivers will be turned on to transmit at random intervals radio signals of short duration, and during periods of transmittal the receivers will be muted. The transmit time as well as the length of the signal time will vary from unit to unit also. This alternate transmit-receive function of each transceiver will repeat and since each person did not turn on the transceivers at the same time, the signal transmit phase will be random.

In FIG. 2, person A is shown with the transceiver turned on so short duration signals will be transmitted as seen at S, and the blank spaces R between signal S broadcast will represent periods when the receiver will be open to receive a signal broadcast from an adjacent transceiver within the broadcast range. Person A is not close enough to have the transceiver pick up a signal. However, persons B and E are close enough so the signal broadcasts are beginning to overlap, but the transceivers carried by persons B and E are still not within range to pick up the broadcast signals S. The presence of persons C and D are close enough so the broadcast range of signals S and the reception of signals during the blank periods is now picked up and persons C and D are aware of the presence of the other. As applied to hunters, the persons A, B, C and D may be carrying guns having an effective shooting distance that for persons C and D would be dangerous to fire a gun for fear of one person hitting the other person. The transmit-receive routine of each transceiver 10 will continue as long as two or more transceivers are within the predetermined range of the transmitters. The predetermined range is that range in which the radio signals S are strong enough to be received to set off the sound or visual transducer of another transceiver.

The foregoing disclosure has set forth a presently preferred embodiment of the invention relating to a personal electronic signaling apparatus to be worn or carried by each of several persons who move about in a common area hunting for game, and who do not know of the presence of the others except by means of radio communication through the electronic apparatus which combines a transmitter and receiver, which transmitter sends short range radio frequency signals from one person at random times to be picked up by a receiver on another person that is not in visual communication with the first person. The apparatus is constructed to incorporate a pulse generator, a pulse interval timer and a mute pulse inverter for rendering the receiver mute during times when the transmitter is active. No adjustment provision is required as it is intended that all persons shall be equipped with the same type of apparatus so that each apparatus transmits on the same radio frequency and the receivers are tuned to that radio frequency. It is also a feature of the embodiment that the signal picked up by the receiver activates a pizeo device or an LED emitter to alert the wearer that there is a transmitter within range and caution is to be exercised. The pizeo vibrator when activated is felt or heard by the person, or if an LED is provided for a person who is deaf or who has impaired hearing such an LED needs to be placed on that person in position to be easily seen. A suitable location might be on the bill of a cap.

The preferred apparatus permits the practice of the method of allowing two or more persons to alert each other of the presence of the others so that care and caution can be exercised through the constant communication established within a distance that is about equal to the range of a gun used for hunting.

While the foregoing description has set forth a preferred apparatus, it is not intended to be limited thereto as modifications and changes may come to mind after this disclosure has been considered.

What is claimed is:

1. A personal electronic signaling apparatus used by each one of several persons moving about in a common area out of visual contact, each said apparatus comprising:

(a) a combined transmitter-receiver capable of transmitting a radio frequency signal over a short range and receiving radio frequency signals from transmitted radio frequency signals emanating from at least another one of said apparatus;

(b) a combined pulse generator and a pulse interval timer cooperating together with said combined transmitter-receiver for allowing automatic transmission and reception of radio frequency signals; and (c) a mute pulse inverter cooperating with said transmitter-receiver for rendering said radio frequency signal receiver of said combined transmitter-receiver mute during times when transmission of radio frequency signal is active and returning said receiver to a radio frequency signal receiving mode between said active radio frequency signal transmissions.

2. The personal electronic signaling apparatus set forth in claim 1 wherein said combined transmitter-receiver is capable of transmitting a nonadjustable radio frequency signal of short duration.

3. The personal electronic signaling apparatus set forth in claim 2 wherein said radio frequency signal has a predetermined low power signal strength for limiting signal range.

4. An electronic signaling apparatus for use in establishing the recognition by one person of the presence of another person not in visual communication, said apparatus comprising:

(a) a radio frequency transmitter;

(b) a radio frequency receiver;

(c) means interconnecting said transmitter and receiver consisting of a pulse generator, pulse interval timer, and receiver mute pulse inverter;

(d) a signal generating transducer connected to said radio frequency receiver to convert received radio frequency signals into a signal capable of being perceived by a person;

(e) a source of electrical energy connected to said radio frequency transmitter and receiver for driving the same to generate automatically transmission of radio frequency signals of short duration and to mute the radio frequency receiver during radio frequency transmissions; and (f) an on-off control inserted in said connection of said source of electrical energy to said radio frequency transmitter and receiver, said on-off control being the only control in said apparatus.

5. A method for establishing communication between two or more persons upon finding themselves in a common area but not in visual communication, the method comprising the steps of:

(a) providing each person with a personal electronic signaling apparatus;

(b) limiting each signaling apparatus to the same low power short duration and random transmission of a predetermined (c) conditioning each of the signaling apparatus for reception of transmitted radio frequency signals during the periods of time between the short duration of the random transmission of the predetermined radio frequency signals from the signaling apparatus; and (d) converting the transmitted radio frequency signals received from a remote personal electronic signaling apparatus into a signal that represents the presence of a person out of visual communication but within the range of said broadcast of a radio frequency signal.

6. The method of claim 5 wherein a further step comprises restricting each signaling apparatus so that the persons provided with the signaling apparatus are not able to change the predetermined radio frequency signal value.

* * * * *

UNITED STATES PATENT AND TRADEMARK OFFICE

CERTIFICATE OF CORRECTION

PATENT NO. : 4,833,452
DATED : May 23, 1989
INVENTOR(S) : Sam L. Currier and Billy Dean Martin It is certified that error appears in the above-identified patent and that said Letters Patent is hereby corrected as shown below:

Title page, line [75] "Inventor" should be "Inventors: Sam L. Currier and Billy Dean Martin, both of Thayer, Mo."

Column 4, line 60, after "predetermined" insert "value of radio frequency signal;".

Signed and Sealed this

Fourteenth Day of January, 1992

*Attest:*

HARRY F. MANBECK, JR.

*Attesting Officer* — *Commissioner of Patents and Trademarks*